United States Patent

Babunovic

[15] 3,650,146
[45] Mar. 21, 1972

[54] CONTAINER PRESSURE TESTING APPARATUS
[72] Inventor: Momir Babunovic, Des Peres, Mo.
[73] Assignee: Barry-Wehmiller Company, St. Louis, Mo.
[22] Filed: June 2, 1970
[21] Appl. No.: 42,683

[52] U.S. Cl. ...................................................73/37
[51] Int. Cl. .....................................................G01m 3/02
[58] Field of Search............73/37, 41.2, 45.4, 45.5, 49.2, 73/49.3, 94; 209/87, 92

[56] References Cited

UNITED STATES PATENTS

| 528,987 | 11/1894 | Ranney | 73/41.2 |
| 3,010,310 | 11/1961 | Rowe | 73/45 |
| 2,399,391 | 4/1946 | Russell | 73/45.4 |
| 3,464,260 | 9/1969 | Heyman | 73/94 |
| 1,766,019 | 6/1930 | Garrett | 73/45 |
| 2,352,091 | 6/1944 | Fedorchak et al. | 73/37 UX |

*Primary Examiner*—S. Clement Swisher
*Assistant Examiner*—William A. Henry, II
*Attorney*—Gravely, Lieder & Woodruff

[57] ABSTRACT

Apparatus for testing containers for load and internal pressure resistance within the requirements of commercial specifications by subjecting a moving stream of containers to axial loading as well as high internal pressure loading while submerged in a shock absorbing bath to control fragmentation upon failures.

11 Claims, 11 Drawing Figures

PATENTED MAR 21 1972          3,650,146

CONTAINER PRESSURE TESTING APPARATUS

BRIEF DESCRIPTION OF THE INVENTION

This invention relates to apparatus for subjecting containers to loading as well as internal high pressure tests to determine the longevity of usefulness in commercial trade channels.

It is a standard for beverage containers that each container should withstand a minimum internal pressure of about 150 p.s.i. for one minute under the ASTM method (C–147–62) for a single trip, one-way, non-returnable container. Container manufacturers have determined that equivalent test results for predicting the longevity of a container may be obtained by subjecting the container to an internal pressure of from 200 to 300 p.s.i. for one-tenth seconds. However, existing apparatus is not adapted for high pressure testing in the range of pressure required to meet the theoretical test requirements.

The objects of the present invention is to provide a simple and effective apparatus for automatically subjecting containers to either static loading or internal pressure testing up to 300 p.s.i., to test containers on a continuous flow basis, to conduct the high pressure testing in a bath to protect personnel from container fragmentation hazards, to receive containers in a continuous stream and return the successful containers to the stream, and to control and collect container fragmentation particles for removal to a safe collecting zone that will be remote from the moving stream of containers.

The preferred apparatus includes a tilted rotary testing head that receives and discharges containers in a loading and unloading zone remote from a pressure testing zone in which successive containers are conditioned for submergence in a bath for the pressure test. The apparatus is provided with means to receive containers in a normal erect attitude, clamp the containers preparatory to pressurization, shield the containers to control the direction of flying particles in the event of fragmentation, apply the test pressure while each container is submerged in a bath of fluid to cushion fragmentation, and to automatically return the containers to an erect attitude for conveyance to subsequent processing apparatus after successfully passing the test.

It is also preferred that the apparatus of this invention may comprise a rotary carrier having an elevated container receiving and discharge zone and a lower container pressure testing zone, container pockets on the carrier provided with means to clamp the containers in the pockets and to release the same, control means operable on rotation of the container carrier to effect clamping and release of the containers and to maintain the containers clamped in the travel through the testing zone, a source of pressure fluid, and means operable to apply the pressure fluid to the containers in the testing zone and to exhaust the pressure fluid in advance of the container discharge zone.

The scope of the present invention may include apparatus comprising horizontal conveying means for moving containers into and out of loading and discharge stations, rotary carrier means disposed adjacent the loading and discharge stations, means adjacent the loading station to transfer containers into the rotary carrier, other means adjacent the discharge station to transfer containers back to said conveying means from said carrier, pressure fluid testing means engaging with the containers transported by said carrier means, and container fragmentation cushioning means adjacent the path traversed by said carrier means. In this form of apparatus the rotary carrier means establishes a path of movement of the containers such that the containers are received and discharged while in a generally vertically erect position and are moved into a position where the container is tilted over so that its side faces downwardly so that the container is presented to the fragmentation cushioning means in the event internal pressure causes container fragmentation.

BRIEF DESCRIPTION OF THE DRAWINGS

A preferred form of the invention is shown in the accompanying drawings, wherein.

DESCRIPTION OF ONE APPARATUS

Figure 1:
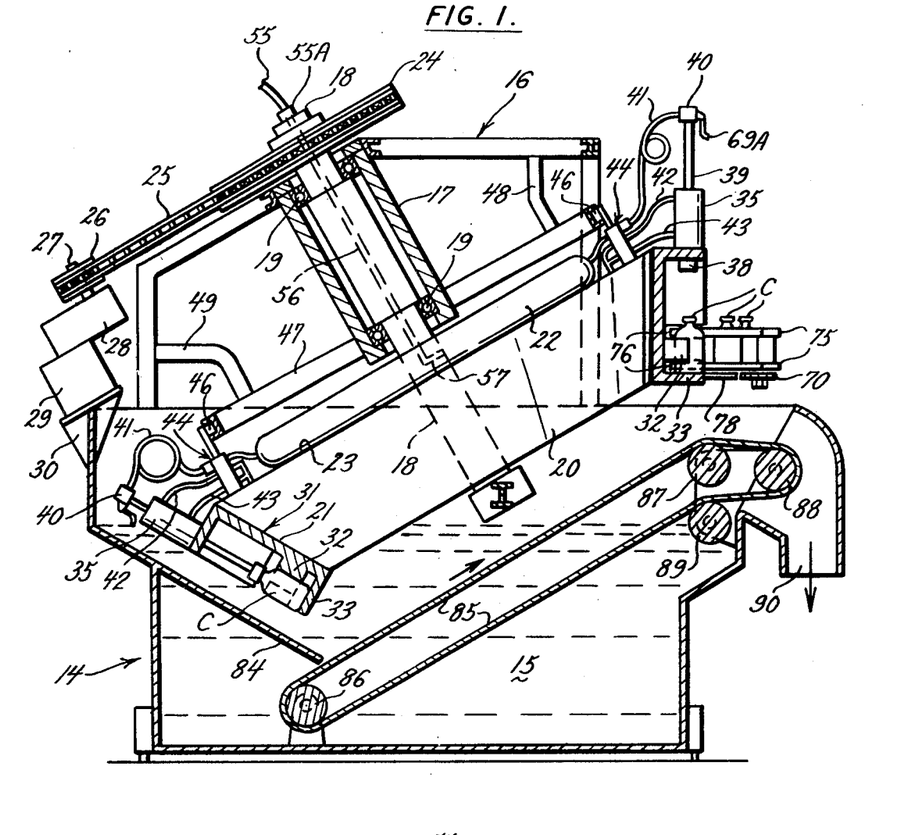
FIG. 1 is a somewhat schematic and sectional elevational view of container pressure testing apparatus to illustrate the principle of the invention.

In FIG. 1 a satisfactory embodiment of the apparatus is seen in schematic disclosure to present the structure in as simple a form as possible. In this view a circular open top tank 14 contains a suitable fluid bath 15 for a purpose to appear. The tank 14 is provided with a suitable super-structure 16 to support a bearing housing 17 for a drive shaft 18 supported by thrust bearings 19. The shaft 18 supports a container carrier in the form of a circular tank 20 for low pressure fluid (as air). The tank 20 may be in the form of a truncated cone having the cone shaped side wall 21. A high pressure fluid tank 22 is mounted on the top wall 23 of the tank 20. Each of the tanks 20 and 22 is circular in plan as will appear. The outer end of drive shaft 18 is connected to a sprocket wheel 24 to be driven by a chain 25 from a sprocket wheel 26 on the shaft 27 of a drive unit comprising a gear box 28 and motor 29. The drive unit is mounted on a bracket base 30 carried by the tank 14.

The axis of shaft 18 is tilted off the vertical at an angle sufficient to position the tank side wall 21 at the right hand side in a substantially vertical attitude. This angular tilt causes the opposite portion of the side wall 21 (at the left side) to descent into the bath 15 and face substantially downwardly into the tank below the upper margin of the tank wall. In one form of the apparatus the angle of tilt of shaft 18 was 30 degrees so that the zone of the tank wall 21 at the right side attained a vertically erect attitude and the zone at the left side assumed a position of tilt at 60 degrees to the vertical. This tilted condition, therefore, established an elevated zone at the right side and a lower zone at the left side.

The tank wall 21 furnishes a carrier or support for a series of container pockets 31 extending about the circumference of the wall 21. Each pocket 31 is provided with a container receiving cup 32 spaced above the flat platform 33 of the pocket 31. The top wall 34 of each pocket 31 supports a motor cylinder 35 enclosing an operating piston 36 which is connected to a quill type piston rod 37 passing through the cylinder 35. The rod 37 carries a container clamping head 38 suitably recessed at 39 to form a cap seal over the mouth of a container C and securely clamp the container on the platform 33 of the pocket. The opposite outer end of the rod 37 is provided with a valved head 40 tapped to receive a pressure fluid conduit 41. The motor cylinder 35 is suitably tapped adjacent its opposite ends for pressure fluid conduits 42 and 43 respectively.

The top wall 23 of the tank 20 supports a control valve 44 for each of the pockets 31. Each control valve contains a plurality of spaced pistons carried on an actuating rod 45. The outer end of each rod 45 is provided with a follower roller 46 engaged in the track of a fixed circular or ring shaped cam member 47. Cam member 47 is suitably supported by arms 48 and 49 connected at suitable places to the super-structure 16. The cam member extends about the top wall 23, and its shape varies in its spacing from the plane of the wall 23 for the purpose of actuating the rods 45 of each control valve 44 in accordance with the position of each pocket 31 in its travel during the rotation of shaft 18 from the elevated zone through the lowered zone and back to the elevated zone.

Figure 2:
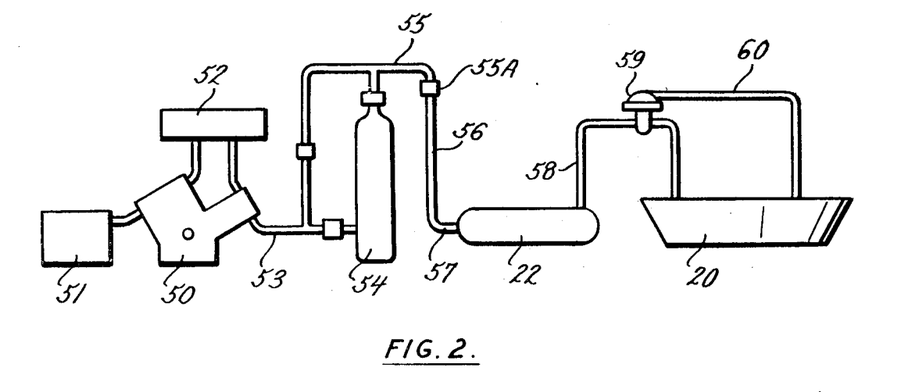
FIG. 2 is a diagram of the means for establishing sources of high and low pressure fluid used in the apparatus of FIG. 1.

In FIG. 2 the source of pressure fluid comprises a two-stage air compressor 50 having an air filter intake at 51. A cooler 52 is connected between the low and high pressure stages of the compressor. High pressure air is delivered at conduit 53 and a dryer 54 is connected in parallel with the conduit 53, so that a final delivery conduit 55 leads to a suitable union 55A at the outer end of the drive shaft 18. The shaft is formed with a passage 56 which runs axially therethrough to a branch passage 57 which opens to the high pressure tank 22. The connections between tanks 22 and 20 is best seen in FIG. 2 where a conduit 58 is tapped into tank 22 and into tank 20. A low pressure diaphragm control valve 59 is inserted in conduit 58, and the valve 59 responds to pressure feedback in the conduit 60 tapped into the tank 20 so that when the pressure desired in tank 20 is satisfied the valve 59 closes. Thus, the pressure in tank 20 is continuously monitored to the desired pressure level.

Figures 4, 5:
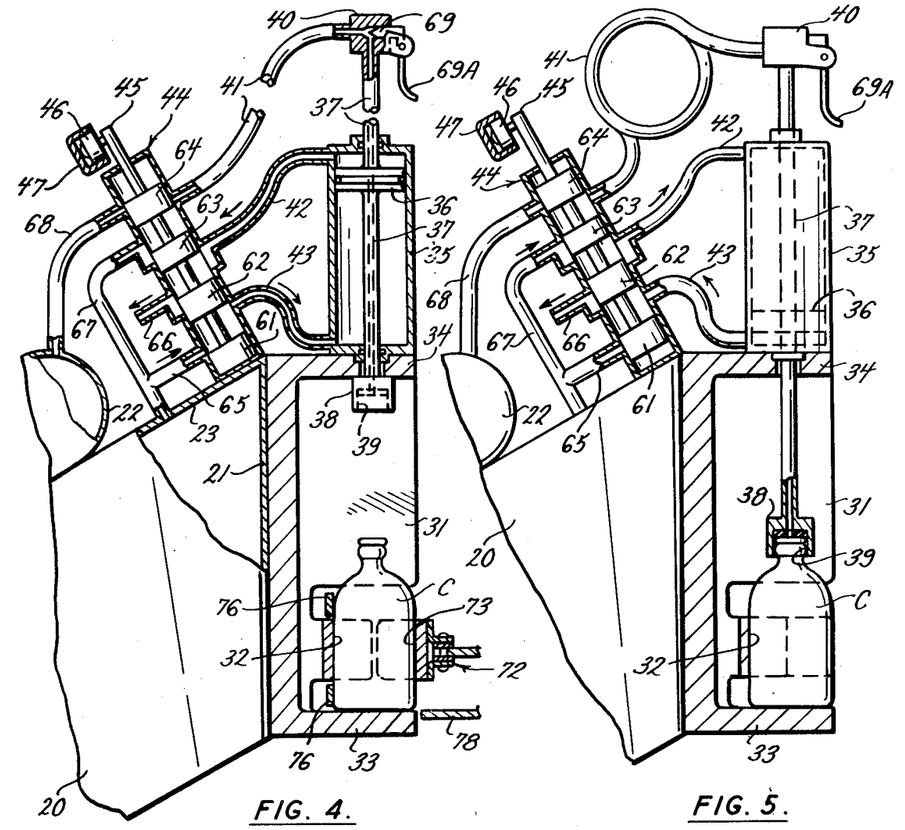
FIG. 4 is a fragmentary and partial sectional view of a typical container pocket and the control means associated therewith.
FIG. 5 is a view similar to FIG. 4 showing the control conditions for station 2 indicated in FIG. 3.
Figure 6:
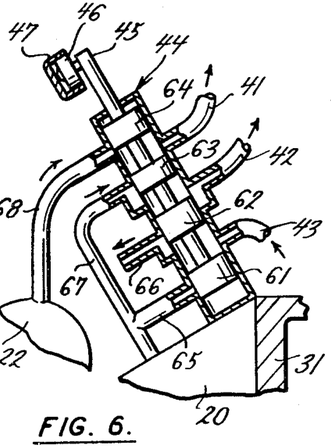
FIG. 6 is a fragmentary view, similar to FIG. 4 of the control valve setting corresponding with the position of the container pocket in the vicinity of station 3 designated in FIG. 3.
Figure 7:
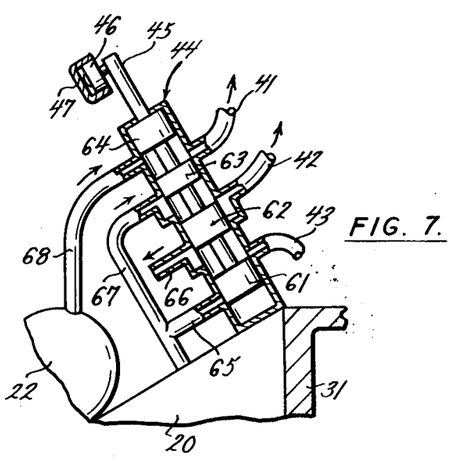
FIG. 7 is a fragmentary view of the control valve setting corresponding to station 5 in FIG. 3.
Figure 8:
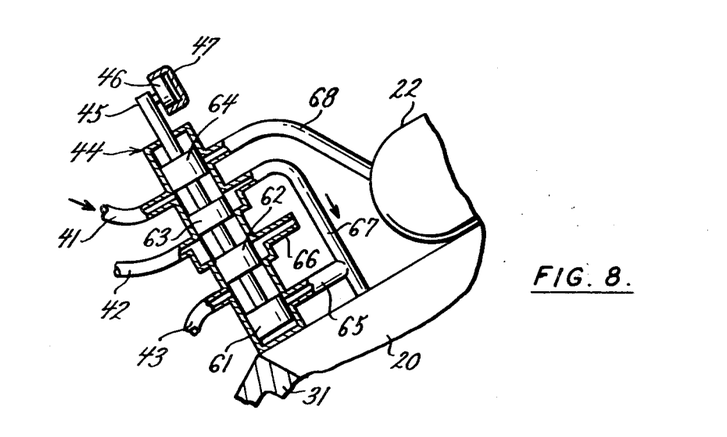
FIG. 8 is a view similar to FIGS. 6 and 7, but corresponding to the vicinity of stations 6 and 7 in FIG. 3.

In FIG. 4 there is shown in fragmentary sectional detail the preferred structure for operating the clamping of containers as each enters the apparatus, and for controlling the clamping action as well as supplying pressure fluid from the low and high pressure tank sources. Each pocket 31 around the peripheral wall 21 of tank 20 is provided with a control valve 44, as before noted, and a control rod 45 subject to actuation by the roller 46 following cam member 47. The control rod 45 in each valve 44 carries a plurality of spaced valving pistons 61, 62, 63 and 64. The bottom most piston 61 controls the passage of a low pressure fluid between conduit 43 and a conduit 65 tapped into the tank wall 23. The next adjacent piston 62 controls the passage of pressure fluid between either conduit 42 or 43 and an exhaust conduit 66 which is open to atmosphere. The next adjacent piston 63 controls the passage of pressure fluid between conduit 42 and the exhaust conduit 66 or the supply conduit 67 which is tapped into conduit 65 to receive low pressure fluid. The topmost piston 64 controls the passage of high pressure fluid between conduit 41 and conduit 68 tapped into the high pressure fluid source at tank 22. The head 40 contains a suitable check valve 69 which operates to close conduit 41 upon a pressure drop in this conduit. The absence of a container under the cap 38 allows the quill to move in so that the actuator 69A engages the cylinder 35 and is moved to close the valve 69. It is, of course, understood that there is a control valve 44 for each pocket 31 and that this requires an equivalent number of conduits 68 from the tank 22 as well as conduits 65 from tank 20. Thus, the organization of conduits and control valves 44 seen in FIG. 4 is repeated for each pocket 31 and it is not believed necessary to show each one as the drawings would be unduly complicated.

Figure 3:
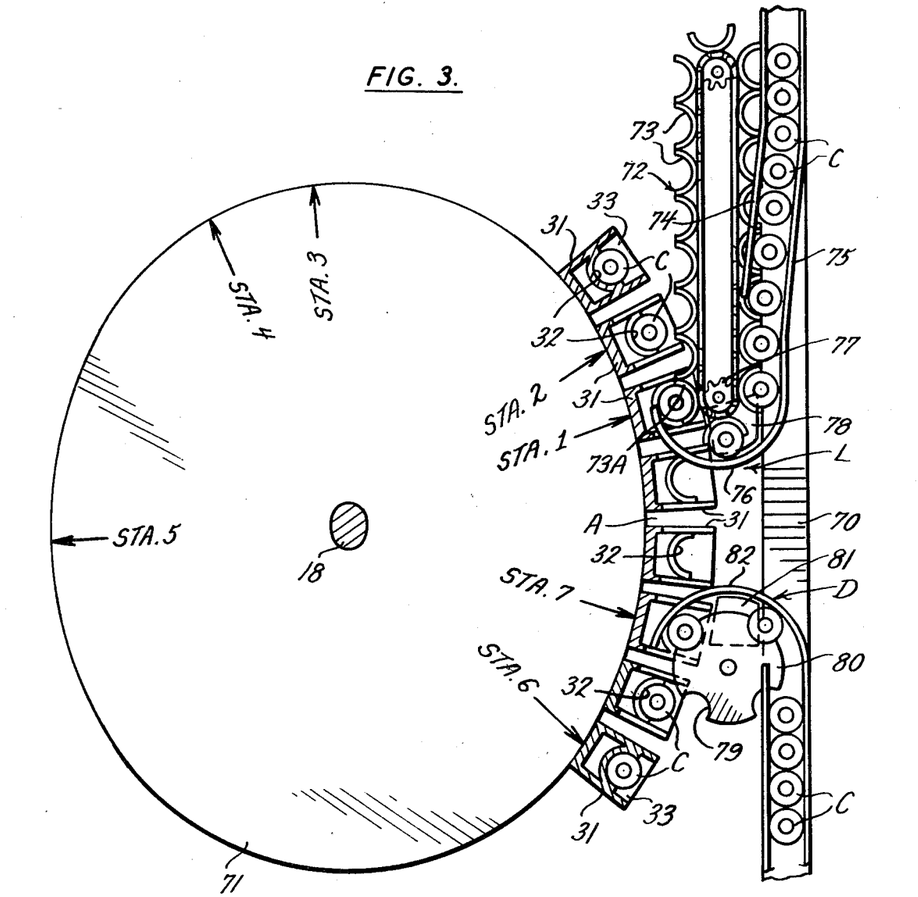
FIG. 3 is a diagrammatic plan view of the apparatus showing the container feed and discharge means for the testing apparatus.

Turning now to FIG. 3, there is shown in diagrammatic outline the arrangement for conveying containers into and out of the present apparatus. A flat top conveyor 70 is horizontally directed in spaced tangency with the path or rotation of the pockets 31, the path being indicated by the elliptical line 71 which results from the vertical projection of the tilted carrier 20 of FIG. 1. The transition of the containers C from the feed-in portion of conveyor 70 is effected by an intermediate endless pocketed conveyor 72 having a series of container pockets 73 movable adjacent conveyor 70. The pockets 73 move between suitable fences 74 and 75 which form a lane for the containers C. The fences 74 and 75 are angled toward the loading zone L of the testing apparatus, and the fence 75 has a curved portion 76 which follows the end sprocket 77 of the pocketed conveyor 72 so that each container is brought around an arcuate path and meshes with the cups 32 in each pocket 31. At this loading zone L the pockets 31 are vertically erect to properly receive the containers on the bottom wall 33 as the containers slide over a dead plate 78.

After the containers traverse the path 71 they are brought to a zone of discharge D where each one is caused to mesh with a pocket 79 in a rotary star wheel 80 driven in timed relation with the shaft 18. The star wheel 80 moves the container over a dead plate 81 and in cooperation with a curved fence 82 the containers are swept out of the pockets 31 and returned to the conveyor 70 for movement to the next processing stage.

Figures 9, 10:
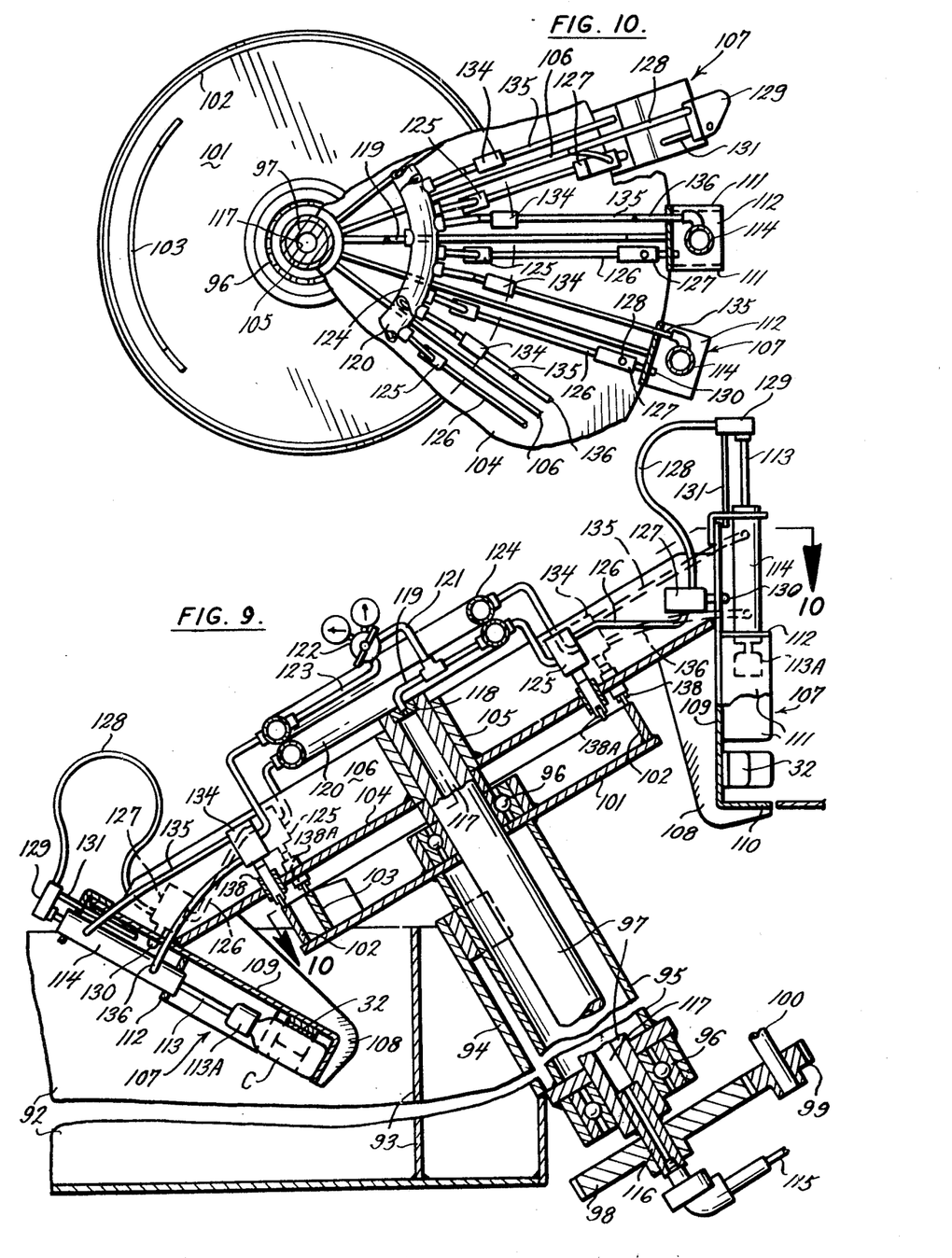
FIG. 9 is a fragmentary sectional elevational view of pressure testing apparatus employing the principles hereof but modified relative to FIG. 1.
FIG. 10 is a fragmentary view taken along line 10—10 in FIG. 9.

In FIGS. 9 and 10 a modified embodiment of apparatus for practicing the invention has been disclosed in sufficient detail to enable others to make and use the same. The apparatus of these views differs from the first described apparatus in that the tank 92 has a rear wall portion 93 spaced inwardly from a sloped wall 94 to support a sleeve 95 carrying bearings 96 near its opposite ends for a rotary shaft 97. The shaft 97 is driven by a set of gears 98 and 99 with power input from shaft 100. The upper end portion of the fixed sleeve 95 carries a fixed circular plate 101 on which is mounted a circular container clamp control cam 102 and an arcuate pressure fluid control cam 103. Above the cams 102 and 103 is a rotary plate 104 carried on the rotary sleeve 105 surrounding the upper end of shaft 97. The plate 104 carries a plurality of webs 106 arranged in fanlike spacing about the sleeve 105 as the hub. The outer end of each web and the adjacent plate supports a container pocket 107 in conjunction with a bracket 108 engaged along the back wall 109 and bottom platform 110 of the pockets. Each pocket 107 has spaced side walls 111 and a top wall 112 through which the quill type piston rod 113 extends to operate the container clamping head 113A. The motor cylinder 114 operates rod 113 in the same manner as for motor cylinder 35 of FIG. 1.

A source of high pressure fluid is connected by conduit 115 to a suitable adapter means 116 at the lower end of an axial passage 117 in shaft 97. The upper end of passage 117 is provided with a suitable connection 118 for a conduit 119 which leads to a circular manifold 120 for high pressure air. A branch conduit 121 from conduit 119 leads to a pressure reducer device 122 equipped with gauges to monitor the pressure in conduit 123 which supplies a low pressure manifold 124. The high pressure manifold 120 supplies a series of control valves 125 one for each pocket 107. The valves 125 are three-way spool types, such as that made by Pneumatics, Inc. of Highland, Mich. and designated OCLA3. Each control valve 125 is connected by conduit 126 to a safety shut-off valve 127, and the valve 127 is connected by a flexible conduit 128 to the head 129 on the quill rod 113 actuated by motor cylinder 114. The safety valve 127 has an actuator arm 130 projecting into the path of descent of a trip rod 131 carried by the head 129, the rod 131 sliding through the guide 132 on the back wall 109 of the pocket 107. The trip rod 131 hits valve arm 130 if the container clamping head 113A descends too far to indicate absence of a container or a broken container. This action shuts off the flow of high pressure air in line 128.

The low pressure manifold 124 supplies a series of control valves 134, one for each motor cylinder 114. The valves 134 are four-way spool types, such as that made by Pneumatics, Inc. of Highland, Mich., and designated OCLA4. The control valve 134 has a first conduit 135 connected to the head end of the cylinder 114 and a second conduit 136 connected to the bottom end of the cylinder 114. The function of the valve 134 and conduits 135 and 136 is substantially the same as for the control valve 44 and conduits 42 and 43 connected to cylinder motor 35 of FIG. 1. The sequence of action of each control valves 134 is continuously governed by the cam 102 through a suitable cam follower 138 fixed in the plate 104 so as to be aligned with the valves 134. The contour of the edge of the cam 102 varies as required. Similarly cam followers 138A are carried in plate 104 in alignment with the valves 125 and also in alignment with the cam 103 (FIG. 10) which has only a brief (about 45° of arc) engagement to open the valves 125 and supply high pressure air after the container has been engaged and clamped by the means 113A and has traveled a distance around the circle to place the pocket 107 within the fluid in tank 92.

OPERATION OF THE APPARATUS

The operation of the first described apparatus is best understood with reference to the sequence of views in FIGS. 4 to 8 inclusive, and with reference to the several stations indicated in FIG. 3. In other words, as the pockets 31 reach the successive stations indicated in FIG. 3, the control means heretofore described generally in FIGS. 1 and 3 performs a necessary function. In the several views now to be described similar reference characters will be applied throughout to refer to similar parts and components.

With the conveyors 70 and 72 operating and motor 29 rotating the container testing apparatus, the successive containers C are fed into the successive pockets 31 at the loading station L (FIG. 3) and begin the traverse of the path 71 through stations 1 to 7 inclusive. From station 7 the containers C are transferred by the star wheel 80 to conveyor 70. The organization of parts and components as containers C enter station 1 has been shown and described in FIG. 3 and at the right side in FIG. 1.

Upon the container C reaching station 2, as in FIG. 5, the cam member 47 will cause the valve rod 45 to move the plurality of pistons 61–64 outwardly such that low pressure fluid from tank 20 is admitted from conduit 67 to conduit 42 to drive the clamping piston toward the container C. This action is accompanied by piston 62 being moved to connect conduit 43 to the exhaust conduit 66, thus exhausting the cylinder space under piston 36. Downward movement of the piston 36 seats the clamping cap 38 over the mouth of the container C and holds it against the platform 33 of the pocket 31.

The container C is advanced to station 3 (FIG. 6) where the cam member 47 moves the follower roller 46 and connected rod 45 outwardly a distance sufficient to cause piston 64 to begin to open the high pressure conduit 68 to conduit 41 which connects to the head 40 of the quill rod 37 in the clamping cylinder 35. The slight shift of piston 64 does not change the functional setting of pistons 61, 62 and 63 so that the container continues to be clamped in position.

The advance of the container C to station 4 (FIG. 7) is accompanied by the cam member 47 moving the piston 64 outwardly to full open position, with no functional change of pistons 61, 62 and 63. From station 4 the container C is subjected to testing with high pressure fluid, and due to the tilt of the shaft 18 the pocket 31 has changed its angular attitude so it now leans downwardly toward the fluid bath 15 in tank 14. Also, at this station the pocket 31 forms a shield over the container to project particles of the container into the tank should the container fragment due to structural weakness. During a substantial portion of container travel from station 4 through and beyond station 5 (FIG. 3) each container will be submerged in the fluid bath 15 which will cushion the fragmentation shock.

Should a container C fracture at or beyond station 4 it will open the passage in the quill rod 37 to loss of high pressure fluid. However, the sudden pressure drop in the quill rod 37 will be sensed by the quill moving inwardly until the arm 69A is operated to actuate the valve 69 to close conduit 41. The function of check valve 69 will be effective also in the event a container does not reach a pocket 31, so that loss of high pressure will be avoided.

The submergence of each container C in the fluid bath 15 will continue from station 4 for about one-third of a complete turn of the apparatus. The speed of rotation for testing 300 containers per minute will subject the containers to high pressure for about 1.3 seconds which is longer than the normal ASTM test cycle.

At station 6 (FIG. 8) the cam member 47 will move the rod 45 inward a distance sufficient to have piston 64 close communication between conduit 68 and 41. Concurrently, the next adjacent piston 63 will move a distance sufficient to establish communication between conduit 41 and conduit 67 which will dump the high pressure fluid back to the low pressure tank 20 to conserve the pressure fluid. Pistons 61 and 62 will be still effective to retain the container C in clamped position in pocket 31.

The settings of the pistons in control valve 44 will remain in the positions shown at station 6 (FIG. 8) until station 7 (FIG. 5) is reached. At station 7 the cam member 47 will move piston rod 45 inwardly an amount to have piston 64 shut off the high pressure conduit 68 and also close conduit 41 to the low pressure tank 20 conduit 67. Simultaneously, piston 63 will be moved to open communication between conduit 42 and the exhaust conduit 66, so that piston 61 may open low pressure fluid flow from conduit 65 to conduit 43 to raise the clamp cap 38. At this time, piston 62 will cut off communication between conduit 43 and the exhaust conduit 66. The control valve 44 will remain in the setting of station 7 (FIG. 4) through station 7 and back to station 1. The latter settings have been shown and described in FIG. 4.

Returning to FIG. 1, it is seen that the tank 14 is provided with a container fragment directing baffle 84 which extends under the path of travel of the pockets 31 during submergence in bath 15.

The baffle directs the fragments toward the conveyor belt 85 which is trained about idler puller 86 at the bottom of the tank 14. The conveyor belt 85 is directed upwardly over idler roller 87 to a driven pulley 88 and returns over idler roller 89. The belt 85 carries the fragments out of the fluid bath 15 and dumps the same through a chute 90 into a suitable collection bin (not shown).

In operation of the modified apparatus, the containers are fed into the successive pockets 107 at the zone where the pockets are substantially vertically positioned. Shortly thereafter the cam 102 operates low pressure valve 134 to clamp the container under the head 113A. When the plate 104 rotates to move the pocket 107 into the bath of water in tank 92, the high pressure valve 125 is opened to supply pressure fluid through safety valve 127 and into the quill rod 113 for pressurizing the container. If the container is sound it does not break and the cam follower 138A runs off cam 103 to shut off the high pressure. If the container should break or not be placed in pocket 107 the low pressure fluid supplied through conduit 135 will drive the head 113A down sufficiently to cause the trip rod 131 to actuate safety valve 127. This safety action of rod 131 may occur at any place around the arc of travel of each pocket 107 where the high pressure fluid is being supplied or prior to its being supplied, as for an empty pocket 107.

In each form of the apparatus disclosed herein it is important to feed the containers at the proper place in the circular orbit of the pockets 31 or 107. Each of these pockets is provided with a cup 32 of semicircular form to receive the containers C. Referring now to FIG. 3 it can be appreciated that in the orbit of the pockets 31 there is a momentary place at the point A when each pocket is substantially vertically erect. As the pocket 31 passes this point A it begins to lean away from the level of the path of movement of the conveyor feed pockets 73. This is a critical point as the container C must be passed from pocket 73 into cup 32 on the fly. The transfer is accomplished by timing the arrival of both cup 32 and pocket 73 so that the pocket 73 is travelling at the same relative speed of cup 32. This timing action places the containers in complete control of both cup and pocket so there is no chance of escape. The travel of the cup 32 to station 1 from point A finds that cup 32 will begin to speed up relative to pocket 73 so the container is pushed by the leading surface 73A of pocket 73 into centered position in cup 32 where the head 38 will engage the container C and clamp it in position. Thereafter the cup 32 will move away from the now empty pocket 73 at a faster rate because the pocket 73 has completed its circular travel and slows down to about one-half the speed of the cup 32. Thus, there is a speed matching sequence that must occur from point A to station 1 of cup 32 with the pocket 73 of the feed conveyor 72. The lean or angular motion of cup 32 and its pocket 31 from the momentary erectile position at point A makes the container transfer and control thereof important all the way through station 1, otherwise the container C may not be properly clamped when the clamping head 38 descends.

It is, of course, understood that the modified apparatus of FIG. 9 operates in the same manner for container transfer on the fly from the feed conveyor pockets 73 to the cups 32 in pockets 107. Therefore, the conveyor apparatus shown in FIG. 3 is applied to the apparatus of FIG. 9.

Reference has been made before to the apparatus being capable of applying a load on containers to test for strength of the container as a column to support a load such as would be encountered by stacking the same several layers high in palletizing operations. This character of test load is readily applied through the clamping head 113A and may be completed prior to the internal pressure testing step heretofore fully described.

Figure 11:
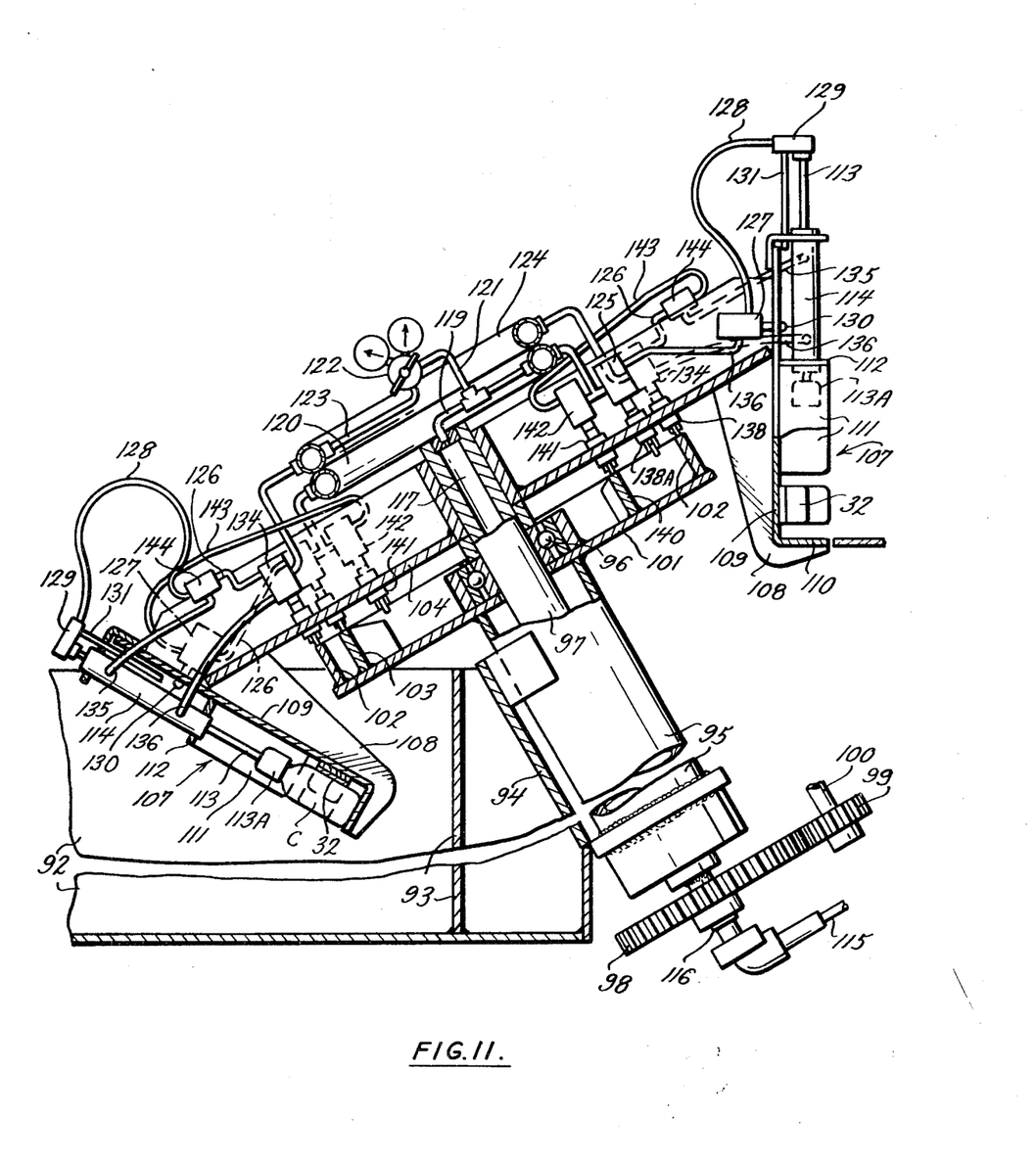
FIG. 11 is a fragmentary sectional elevational view of the apparatus of FIG. 9 involving certain modifications.

While reference will be made to FIG. 11, it is understood that parts shown there will repeat what has been shown in FIG. 9 and it is the aim to use the same reference numerals wherever possible and to describe only the modifications over FIGS. 9 and 10. Thus, in FIG. 11 another cam 140 is mounted on the plate 101 in position to actuate a cam follower 141 mounted in rotary plate 104. The cam follower 141 is located, one for each pocket 107, so it can operate to cycle a suitable valve 142 connected by the same conduit leading to valve 125 from the manifold 120. The valve 142 is connected by a feed conduit 143 to a shuttle valve 144 of suitable commercial type. The shuttle valve 144 is disposed in the low pressure conduit 135 between low pressure control valve 134 and the motor cylinder 114. The shuttle valve in response to the high pressure fluid or air, shuts off the low pressure and applies high pressure air on the motor cylinder 114 to increase the load imposed by the clamping head 113A and exert a desired axial load on the container for a short time determined by the length of the active lobe on cam 140. The low pressure air is, however, still applied to the shuttle valve 144 so that when the cam 140 operates cam follower 141 to shut off the high pressure conduit 143 the valve vents the high pressure air in the motor cylinder 114 to reduce the load. When the motor cylinder pressure gets to the low pressure level the shuttle valve will shift and maintain the low pressure air in the motor cylinder so the container will remain clamped while the container moves on into the fluid bath in tank 92 for the internal pressure test. The cam 140 is shown in FIG. 11 and will, in actual practice, be located at about station 2 (FIG. 3) to apply the load and will release the load prior to station 3, or prior to the container being moved into the cushioning fluid in the tank 92.

SUMMARY OF THE DISCLOSURE

It will appear from the foregoing description of apparatus that it is an important purpose to automatically remove containers from a primary conveyor and test the internal pressure of each container up to a preselected test pressure, and to do the testing while each container is submerged in a fluid bath, such as water, prior to its being returned as a sound container to the conveyor for transit to subsequent processing stages. One of the features of the preferred apparatus is to employ a hollow rotary shift inclined at an angle from the vertical and operative to mount the container carrier so that the periphery of the carrier will have approximately one-half of its circumference submerged in a cushioning bath of water for the purpose of confining the container fragments in the event it should burst under the test pressure. Another feature resides in the transfer of the container from the feed conveyor into successive cups 32 of the rotary carrier, and still another is to provide simple means to allow load testing of the containers in the same apparatus for pressure testing.

The method of operating the present apparatus is to utilize low pressure fluid to clamp each container in its individual pocket, load test the containers and move the containers successively in a bath of cushioning fluid where each container is completely submerged at the time it is subjected to a charge of high pressure air admitted to the interior thereof. The control means includes provision for shutting off the high pressure fluid line in the event no container is disposed in the pocket or upon a container fragmenting, whereby no substantial loss of high pressure fluid is experienced. The method of operation of the first described apparatus is to conserve the pressure fluid by exhausting the high pressure fluid injected into each container into the low pressure tank, and to exhaust to atmosphere only the low pressure fluid utilized to operate the container clamping mechanism. The modified embodiment dispenses with the pressure fluid conservation, but has a simpler arrangement of values and operating components.

What is claimed is:

1. Apparatus for strength testing of containers comprising: a rotary container carrier having a container receiving and discharge zone and a container strength testing zone, container pockets on said carrier, means adjacent each pocket operable to clamp containers therein and release containers, control means operably connected to said clamp means to clamp and release containers in said receiving and discharge zones and to maintain containers clamped in said strength testing zone, a source of pressure fluid, means operable to apply said pressure fluid to the containers in said strength testing zone and terminate the application of pressure fluid in advance of said discharge zone, and a second source of pressure fluid operably connected to said clamping means, said control means being a valve to apply and release said second pressure fluid to said clamping means.

2. The apparatus of claim 1 in which said second source of pressure fluid is at a pressure lower than the pressure of said first mentioned pressure fluid source.

3. The apparatus of claim 1 in which stationary cam means is operably connected to said control means to operate the latter for clamping and releasing the clamping of the containers.

4. Apparatus for strength testing of containers comprising: a container carrier rotatable about an axis tilted at an angle to the vertical, container pockets spaced about the periphery of said carrier and movable by said carrier through a first station in which said pockets are substantially vertically erect and a second station in which said pockets are substantially vertically erect and a second station in which said pockets are tilted downwardly, container supply means delivering containers in erect attitude to said first station, container discharge means receiving substantially erect containers from said first station as they are delivered thereto by said pockets, tank means containing a fluid bath adjacent said carrier second station in position for said pockets and containers therein to be submerged in said bath at said second station, a source of pressure fluid connected to said pockets to supply the containers therein with fluid under pressure to the interior to subject each container to a strength test, and control means responsive to the rotation of said carrier to apply said pressure fluid to each container in the travel through said second station, said control means including a valve and valve actuator in the pressure fluid connection, said valve actuator normally opening said valve and operating to close said valve automatically upon no container reaching said pockets and upon bursting of containers in said pockets.

5. Apparatus for strength testing of containers subject to fracturing in use, the improvement comprising: horizontal conveying means for single file movement of the containers into and out of adjacent loading and discharge stations while the containers are in vertically erect positions, rotary carrier means disposed adjacent said stations with a portion of its periphery movable generally tangent to said conveying means at said stations, means adjacent said loading station to transfer containers to said rotary carrier at substantially the speed of said carrier, other means adjacent said discharge station to transfer containers to said conveying means from said carrier, said rotary carrier having a rotary axis tilted off the vertical for moving the containers in a path to tilt the containers outwardly and downwardly and back again to the erect position between said loading and discharge stations, pressure fluid testing means engageable with the containers traveling said path, said testing means including container clamping means, a source of pressure fluid connected to said clamping means to operate the same and a pressure fluid shut-off valve operable automatically to terminate loss of fluid upon fracturing of a container on said carrier and absent a container, and independent valve means responsive to the carrier rotation to shut-off pressure fluid to containers in said loading and discharge stations, and container fragmentation cushioning means adjacent said path, the tilting of the containers outwardly and downwardly being into said cushioning means to absorb the fragmentation of weak containers and said shut-off valve responding to terminate loss of fluid.

6. The apparatus set forth in claim 5 wherein said container transfer means adjacent said loading station included pockets individual to each container, each transfer pocket having a surface thereon for holding the container in said carrier, and said clamping means is responsive to the rotation of said carrier through said loading station to effect container clamping while said pocket surface of said container transfer means holds the container in said carrier, the carrier rotation past said loading station moving the container out of reach of said pocket holding surface.

7. The apparatus of claim 5 wherein said clamp means is operated by said pressure fluid to effectively subject the container to a strength test, and said testing means includes a pressure fluid passage through said clamp means to conduct pressure fluid into and effectively subject the container to an internal pressure test.

8. Apparatus for strength testing of containers comprising: a container carrier rotatable on an axis tilted off the vertical, container pockets spaced about the periphery of said carrier and movable by said carrier sequentially through a substantially erect container loading station a station in which said pockets and containers are tilted toward a horizontal position with said pockets uppermost and back to an erect position, a container positioning cup in each pocket, container conveyor means delivering the containers in erect position to said loading station, an endless pocket conveyor adjacent said container conveyor means to transfer the containers into the carrier pockets while in the erect position, said pocket conveyor operating to position the containers in said carrier pockets, clamp means on said carrier movable to engage and to secure the containers in said carrier positioning cup, a source of pressure fluid connected to said clamp means to move the same into clamping position, control means in said pressure fluid connection responsive to the rotation of said carrier toward said tilted station to operate said clamp means, said clamp means including means to admit pressure fluid into the containers for strength testing thereof while said carrier pockets and containers are moving through said tilted station, and shut-off means on said clamp means responsive to clamp means movement in the event of no container in said carrier pocket or in the event of a container bursting to shut-off the pressure fluid and prevent loss of the pressure fluid.

9. In apparatus for strength testing containers by axial loading and internal pressure, the improvement comprising: container conveyor means having spaced discharge and receiving stations, a rotary carrier positioned relative to said conveyor means such that a portion of the carrier periphery moves adjacent said discharge and receiving stations, container positioning pockets on the periphery of said carrier in position to receive containers in said discharge station and discharge containers in said receiving station, container clamp means in each pocket movable to engage and release the containers therein and additionally movable absent a container or bursting of a container, said clamp means having a passage open to the interior of the container in the pocket upon clamping the container, a source of pressure fluid operably connected to said clamp means to move the same, said fluid pressure connection including a connection to said passage, valve means in said passage normally opening said passage to pressure fluid flow to the container interior, and means operably connected to said valve means to close said valve upon said clamp means undergoing said additional movement.

10. The apparatus set forth in claim 9 wherein said pressure fluid exerts an axial load on said container through said clamp means and causes said clamp means additional movement absent a container or bursting of a container.

11. The apparatus set forth in claim 9 wherein said rotary carrier has an axis or rotation tilted off the vertical so its periphery has a high and a low path of movement, and a fluid bath is located to submerge said carrier and pockets in said low path of movement, said fluid bath cushioning the shock of a container bursting.

* * * * *